United States Patent
Kull et al.

(10) Patent No.: US 8,255,596 B2
(45) Date of Patent: Aug. 28, 2012

(54) MULTIPATH-BASED MIGRATION OF DATA ACROSS STORAGE CONTROLLERS

(75) Inventors: Leon Kull, Tel Aviv (IL); Maxim Kozover, Tel Aviv (IL); Kariel Sandler, Tel Aviv (IL); Moshe Yanai, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/481,966

(22) Filed: Jun. 10, 2009

(65) Prior Publication Data

US 2010/0318692 A1    Dec. 16, 2010

(51) Int. Cl.
*G06F 3/00* (2006.01)
(52) U.S. Cl. ............................................ 710/38; 710/36
(58) Field of Classification Search .................. None
See application file for complete search history.

(56) References Cited

U.S. PATENT DOCUMENTS

| | | | | |
|---|---|---|---|---|
| 5,933,824 | A * | 8/1999 | DeKoning et al. ..................... 1/1 |
| 7,464,019 | B1 * | 12/2008 | Serrano et al. ................... 703/25 |
| 7,620,710 | B2 * | 11/2009 | Kottomtharayil et al. .... 709/223 |
| 7,827,441 | B1 * | 11/2010 | Wenzel ........................ 714/6.13 |
| 2005/0004998 | A1 * | 1/2005 | Mizuno .......................... 709/219 |
| 2007/0043854 | A1 * | 2/2007 | Shum et al. ................... 709/224 |
| 2007/0198797 | A1 * | 8/2007 | Kavuri et al. ................ 711/165 |
| 2008/0046609 | A1 * | 2/2008 | Shum et al. ...................... 710/33 |
| 2008/0115008 | A1 * | 5/2008 | Daftardar .......................... 714/3 |
| 2008/0209136 | A1 * | 8/2008 | Qi et al. .......................... 711/148 |
| 2009/0106255 | A1 * | 4/2009 | Lacapra et al. ................. 707/10 |
| 2009/0125679 | A1 * | 5/2009 | Takeuchi ....................... 711/114 |
| 2009/0187708 | A1 * | 7/2009 | Kurokawa ..................... 711/114 |
| 2010/0095310 | A1 * | 4/2010 | Oshins .......................... 719/327 |
| 2010/0114849 | A1 * | 5/2010 | Kingsbury et al. ........... 707/704 |

OTHER PUBLICATIONS

Microsoft, Highly Available Storage: Multipathing and the Microsoft MPIO Driver Architecture, White Paper, Oct. 2003.*

* cited by examiner

*Primary Examiner* — Henry Tsai
*Assistant Examiner* — Jing-Yih Shyu
(74) *Attorney, Agent, or Firm* — Griffiths & Seaton PLLC

(57) ABSTRACT

Exemplary methods, systems, and computer program product embodiments for migrating existing data from a source storage controller to a target storage controller, each associated with a data processing storage subsystem, using a processor device in communication with a memory device, are provided. The target storage controller is configured with at least one target volume having pass-through support to a source volume of the source storage controller. An input/output (I/O) path to the existing data through the target storage controller is configured. The I/O path is added to an existing I/O path connected to the existing data using an operating system (OS) operational on at least one host in communication between the source and target storage controllers. The OS is adapted for I/O multipath support. Upon completion of data migration, the existing I/O path is removed.

16 Claims, 4 Drawing Sheets

MULTIPATH-BASED MIGRATION OF DATA ACROSS STORAGE CONTROLLERS

BACKGROUND OF THE INVENTION

1. Field of the Invention

The present invention relates in general to computers, and more particularly to a method, system, and computer program product for multipath-based data migration between storage controllers in data processing storage subsystems.

2. Description of the Related Art

Data migration is the process of transferring data between storage types, formats, or computer systems. Data migration is usually performed programmatically to achieve an automated migration, freeing up human resources from tedious tasks. It is required when organizations or individuals change computer systems or upgrade to new systems, or when systems merge.

While automated migration has improved many aspects of the migration process, limitations remain. For example migration of data between storage controllers in data processing storage subsystems typically requires a temporary loss of data access as the data is moved from underneath the responsibility of a source storage controller to underneath the responsibility of a target storage controller.

SUMMARY OF THE INVENTION

In view of the foregoing, a need exists for a mechanism by which loss of access to data during a data migration operation is mitigated, or even more beneficially, eliminated. Accordingly, as will be more thoroughly described in detail, following, exemplary method, system, and computer program product embodiments are provided for multipath-based data migration between storage controllers in data processing storage subsystems. Pursuant to such multipath-based data migration, access to the data is retained through one of at least two I/O paths connected to the data. To facilitate such functionality, several new support elements are incorporated into components of the storage controllers, such as multipath support in the storage controller operating system (OS), as will be further described.

In one such exemplary embodiment, by way of example only, a target storage controller is configured with at least one target volume having pass-through support to a source volume of the source storage controller. An input/output (I/O) path to the existing data through the target storage controller is configured. The I/O path is added to an existing I/O path connected to the existing data using an operating system (OS) operational on a host in communication between the source and target storage controllers. The OS is adapted for I/O multipath support. Upon completion of data migration, the existing I/O path is removed.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for data migration and/or concurrent upgrade of an entirety of components in a computing environment such as a data processing storage subsystem. In one exemplary embodiment, data is migrated between storage controllers over a network as described above. With particular application to a storage controller implementation, the illustrated embodiments may take advantage of so-called "host multipathing" (e.g., a number of input/output (I/O) paths between a particular host and the storage controller) to temporarily split such I/O paths between an existing storage controller and an upgraded storage controller. In addition to leveraging host multipathing, the illustrated embodiments may also implement proprietary I/O commands to communicate locking requirements between new and old systems.

As will be seen, using such host multipathing and I/O commands, the mechanisms provided in the illustrated embodiments provide for data migration "online" using a network connecting the components without the need for physical placement of I/O paths or movement of components.

Figure 1:
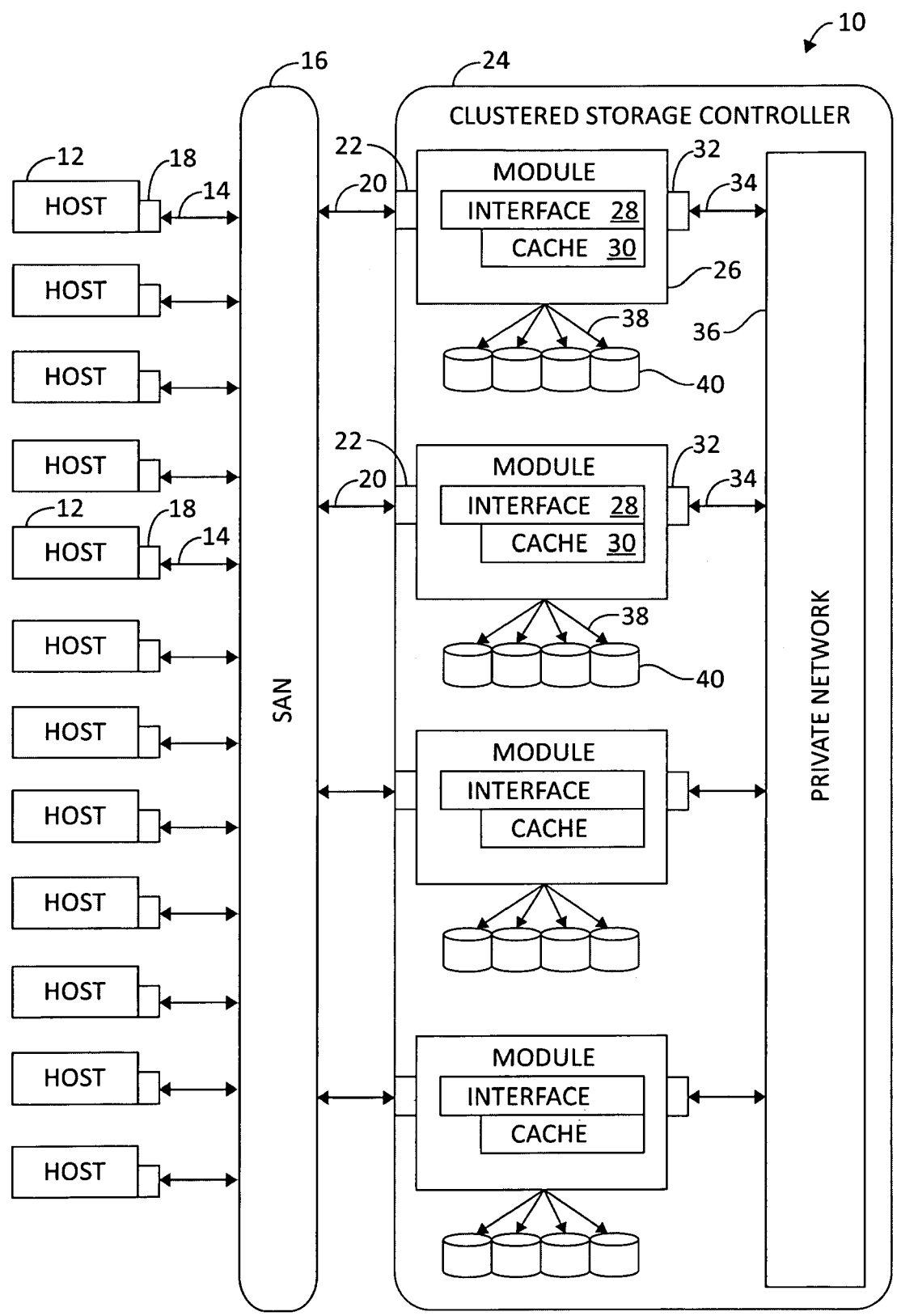
FIG. 1 is a block diagram of an exemplary computing environment including a data processing storage subsystem in which various aspects of the following description and claimed subject matter may be implemented.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other storage subsystems with diverse architectures and capabilities.

The storage subsystem 10 receives, from one or more host computers 12, I/O requests, which are commands to read or write data at logical addresses on logical volumes. Any number of host computers 12 are coupled to the storage subsystem 10 by any means known in the art, for example, using a network. Herein, by way of example, the host computers 12 and the storage subsystem 10 are assumed to be coupled by a storage area network (SAN) 16 incorporating data connections 14 and host bus adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and a private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30 and disks 40.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted, as explained in further detail herein below.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In other implementations the HBAs 18 may be directly coupled to the storage modules.

Data having contiguous logical addresses are generally distributed among the disks 40. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Figure 2:
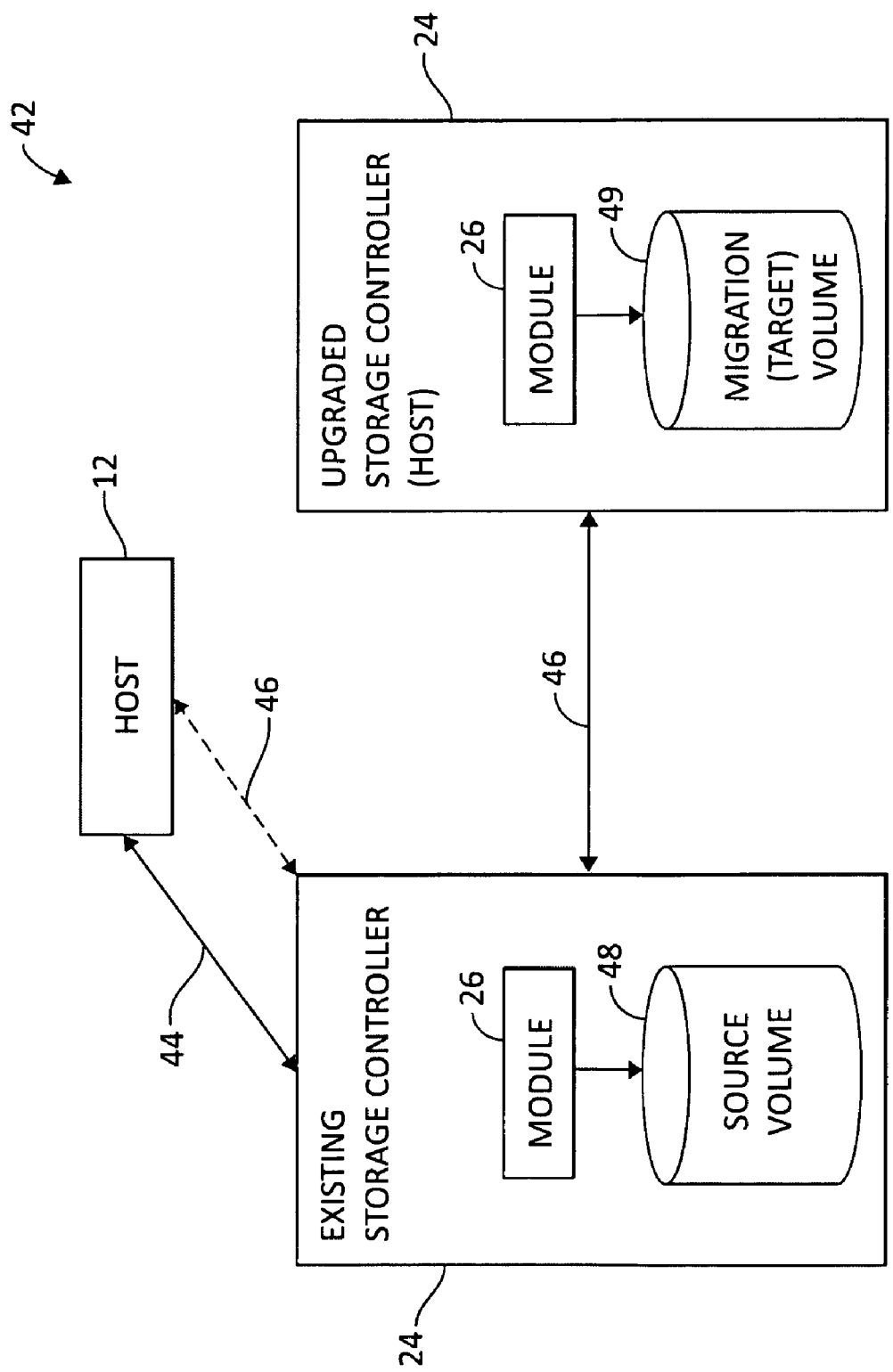
FIG. 2 is an additional block diagram of an exemplary mechanism for upgrading an entirety of components in an existing clustered data storage controller to an upgraded entirety of components in an upgraded clustered data storage controller.

Turning to FIG. 2, following, reference is made to an additional block diagram depicting a mechanism 42 for data communication between one or more hosts 12 (such as a number of clustered hosts implementing reserve/release operations) and an existing storage controller 24 (including each of the subcomponents depicted previously in FIG. 1, such as storage module 26) and an upgraded storage controller 24 containing a number of upgraded components having a relationship to the existing components in the existing storage controller 24. The existing storage controller 24 uses multipathing mechanisms to provide several I/O paths between the host 12 and the existing storage controller 24. Two of such I/O paths are depicted as paths 44 and 46.

For the mechanisms of the present invention to properly operate, at least two paths, such as paths 44 and 46 must exist from every logical volume in the storage controller 24 to the host 12. One of the two paths, such as path 46 is subsequently used to connect to a comparable logical volume in the upgraded storage controller 24. As illustrated in FIG. 2, path 46 includes two portions, a first portion connectin host 12 to existing storage controller 24 and a second portion connectin existing storage controller 24 to the upgraded storage controller 24. In this way, a source volume 48 is established in the existing storage controller 24, which is connected to a migration (target) volume 49 in the upgraded storage controller 24, and the upgraded storage controller 24 is established as an additional host to the existing storage controller 24. Method 200 in FIG. 4, following, describes this process in additional detail.

Figure 3:
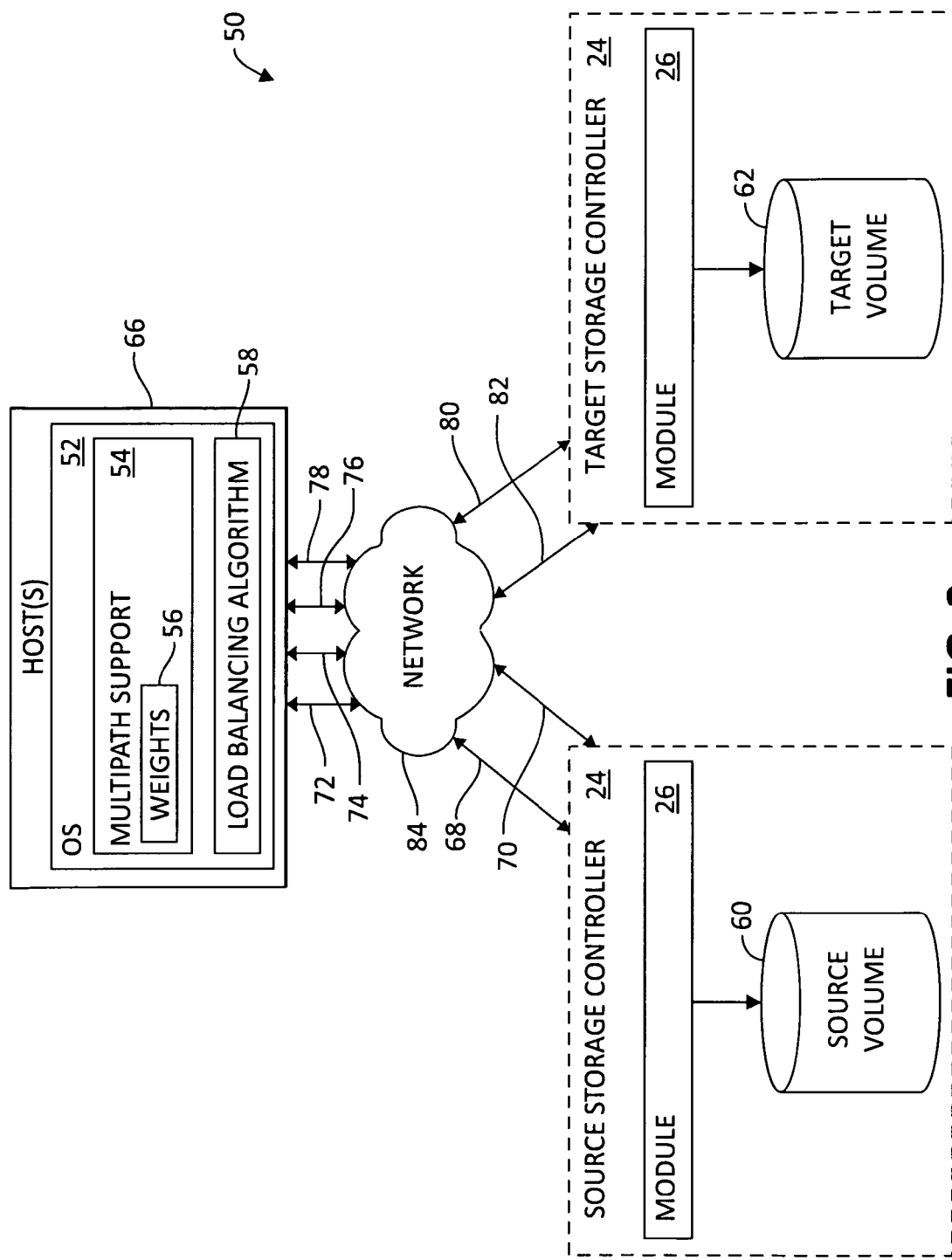
FIG. 3 is an additional block diagram of an exemplary mechanism for data migration between storage controllers over a network incorporating multipathing support.

Turning to FIG. 3, following, reference is made to an additional block diagram depicting a mechanism 50 for data migration between two storage controllers 24 over a network 84. Here as in FIG. 2, previously, a source storage controller 24 uses multipathing mechanisms to provide several I/O paths between the host(s) 66 and the source storage controller. Two of such paths are denoted as paths 68 and 70 between network 84. Similarly, target storage controller 24 implements paths 80 and 82 between network 84. I/O paths 72, 74, 76, and 78 provide data connectivity for I/O paths 68, 70, 80, and 82 from the network 84 to the host(s) 66.

A host or hosts 66 is adapted with an operating system 52 (OS). The OS 52 includes multipath support host module 54 for providing multipath support to the storage controller 24. Requesting applications operable on hosts 66 do not realize that their I/Os are being sent via one I/O path or another, because the multipath support presents the multiple paths as a single I/O path. Each multipath support module 54 includes a number of multipath weights 56 which may be set by a system administrator. Multipath weights 56 may be assigned for each I/O path, for example for I/O paths 68 and 70. Based on the values assigned to the I/O paths, a particular I/O path may be favored or preferred over another I/O path. OS 52 also includes a load balancing algorithm 58 for determining along which of the I/O paths to transfer data. For example, based on particular bandwidth or performance considerations, the OS may utilize load balancing algorithm 58 to implement a greater or smaller amount of data transfer along a particular I/O path. Hosts 66 may leverage I/O multipathing to perform data migration over network 84 from the source volume 60 to the target volume 62 as will be further described, following.

Figure 4:
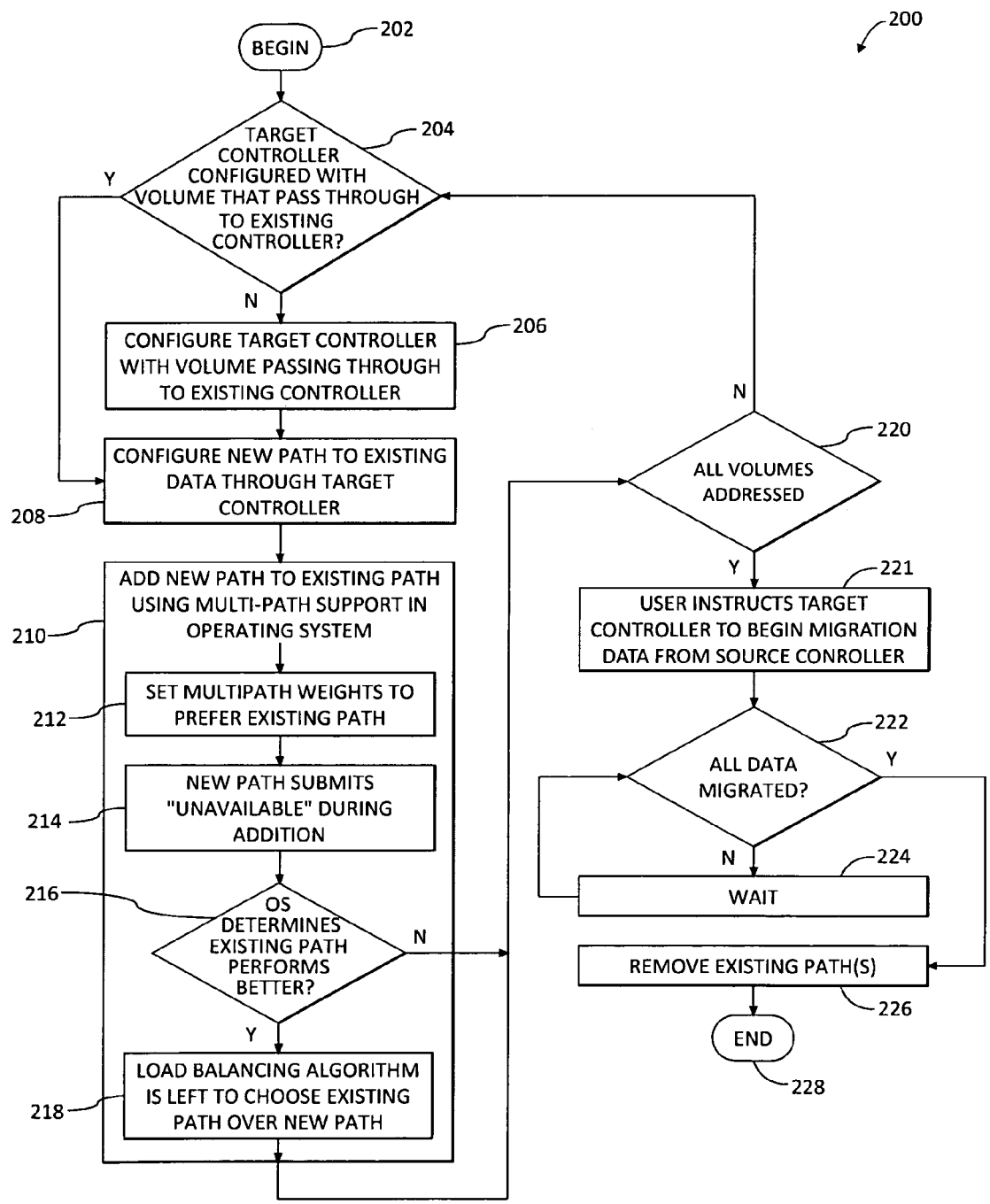
FIG. 4 is a flow chart diagram of an exemplary method for data migration between storage controllers incorporating multipathing support.

Turning to FIG. 4, following, an exemplary method 200 for providing data migration between components over a network is depicted. As one skilled in the art will appreciate, various steps in the method 200 may be implemented in differing ways to suit a particular application. In addition, the described method may be implemented by various means, such as hardware, software, firmware, or a combination thereof operational on or otherwise associated with the computing environment. For example, the method 200 may be implemented at least partially as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 leverages multipathing to split I/O paths between storage controllers (including components such as the storage modules described previously) to provide mechanisms for data migration. In doing so, any loss of access to data by the host(s) is mitigated or eliminated.

Method 200 begins (step 202) with a query as to whether the target controller is configured such that the volume to be migrated exhibits so-called "pass-through" support to the existing (source) controller (step 204). If no, then the target controller is configured as such (step 206) so that the volume in the target controller passes through to the existing controller. If the volume in question has such support (again, step 204), then the method moves to step 208, where a new I/O path to the existing data through the target controller is configured.

As a following step, the method 200 adds the new I/O path to the existing path using the multipath support (step 210), and data migration begins as data is written to the target volume with pass-through read/write support to the source volume. This step, and the following steps 212 and 214 leveraging multipath support, may be provided with the assistance of the multipath support module previously described. To help alleviate potential slow reads/writes through the new I/O path, several alternative approaches may be implemented as described in steps 212-218. In the first, a user, such as the system administrator, sets multipath weights to prefer the existing path (step 212) during step 210. As an alternative and/or in conjunction with step 212, the new I/O path may be adapted to submit an "unavailable" status to a requesting entity (e.g., a host) during the addition process (step 214). As a final alternative, the load-balancing algorithm may determine that the existing path provides greater performance (step 216) and select the existing path on its own (step 218).

Method 200 then moves to step 220, where a query is made as to whether all volumes to be migrated have been addressed in the manner provided by steps 204-218. If no, the method returns to step 204 to perform these steps for an additional migration volume in question. As a next step, the user instructs the target storage controller to start copying (migrating) the data from the source storage controller, and the data migration begins (step 221). Method 200 then queries whether all data is migrated (step 222). If no, the system waits until this is the case (step 224). Once data has been completely migrated between source and target volume(s) (again, step 222), the existing path(s) which connect the host to the source controller are removed (step 226), and the method ends (step 228).

The skilled artisan will appreciate that various steps in the foregoing method 200 may be adapted or changed for a particular implementation. Here again, the illustration of a computing environment including an existing and upgraded, source and target storage controllers is exemplary, and not intended to be limiting to the applicability of the foregoing mechanisms to other types of computer environments, systems, and subsystems.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for migrating existing data from a source storage controller to a target storage controller, each associated with a first host device, using a processor device in communication with a memory device, comprising:
    configuring the target storage controller with at least one target volume comprising pass-through support to a source volume of the source storage controller;
    configuring a first portion of a first input/output (I/O) path from the existing data in the source storage controller to the at least one target volume;
    configuring a second portion of the first I/O path from the first host device to the existing data in the source storage controller;
    temporarily adding, via an operating system (OS) operational on the first host device, a second I/O path connecting the first host device and the source storage controller, wherein temporarily adding includes setting at least one multipath weight to give preference to the first I/O path, and utilizing a load balancing algorithm to determine whether the first I/O path exhibits a better performance than the second I/O path for implementing a greater or smaller amount of data transfer along the first I/O path or the second I/O path;
    migrating data from the source volume to the at least one target volume; and
    upon completion of migrating the data, removing the second I/O path, wherein:
        the OS is adapted for I/O multipath support,
        the target storage controller provides a second host device to the source storage controller, and
        the target storage controller and the source storage controller are each clustered storage controllers.

2. The method of claim 1, wherein temporarily adding the second I/O path includes configuring the second I/O path to submit an unavailable status to a requesting entity.

3. The method of claim 1, further including determining whether the target storage controller has the at least one target volume having pass-through support to the source volume of the source storage controller.

4. The method of claim 1, wherein configuring the second portion of the first I/O path to the existing data is performed at least partially through a network connecting the source storage controller and the target storage controller.

5. A system for migrating existing data from a source storage controller to a target storage controller, each associated with a data processing storage subsystem, comprising:
    a first host module; and
    at least one storage module in communication with the first host module, wherein:
        the at least one storage module is adapted for configuring at least one target volume comprising pass-through support to a source volume of the source storage controller, and
        the host module is adapted for configuring a first portion of a first input/output (I/O) path from the existing data in the source storage controller to the at least one target volume, configuring a second portion of the first I/O path from the first host module to the existing data in the source storage controller, temporarily adding, via an operating system (OS) operational on the first host module, a second I/O path connecting the first host module and the source storage controller, setting at least one multipath weight to give preference to the first I/O path, utilizing a load balancing algorithm to determine whether the first I/O path exhibits a better performance than the second I/O path for implementing a greater or smaller amount of data transfer along the first I/O path or the second I/O path, migrating data from the source volume to the at least one target volume, and removing the second I/O path upon completion of migrating the data, wherein the OS is adapted for I/O multipath support, the target storage controller provides a second host module to the source storage controller, and the target storage controller and the source storage controller are each clustered storage controllers.

6. The system of claim 5, wherein the first host module is further adapted for, pursuant to temporarily adding the second I/O path, configuring the second I/O path to submit an unavailable status to a requesting entity.

7. The system of claim 5, wherein the first host module is further adapted for determining whether the target storage controller has the at least one target volume having pass-through support to the source volume of the source storage controller.

8. The system of claim 5, wherein the first host module is further adapted for configuring the second I/O path to the existing data at least partially through a network connecting the source storage controller and the target storage controller.

9. A computer program product for migrating existing data from a source storage controller to a target storage controller, each associated with a first host device, using a processor device in communication with a memory device, the computer program product comprising a computer-readable storage medium having computer-readable program code portions stored therein, the computer-readable program code portions comprising:
    a first executable portion for configuring the target storage controller with at least one target volume comprising pass-through support to a source volume of the source storage controller;
    a second executable portion for configuring a first portion of a first input/output (I/O) path from the existing data in the source storage controller to the at least one target volume;
    a third executable portion for configuring a second portion of the first I/O path from the first host device to the existing data in the source storage controller;
    a fourth executable portion for temporarily adding, via an operating system (OS) operational on the first host device, a second I/O path connecting the first host device and the source storage controller, for setting at least one multipath weight to give preference to the first I/O path, and for utilizing a load balancing algorithm to determine whether the first I/O path exhibits a better performance than the second I/O path for implementing a greater or smaller amount of data transfer along the first I/O path or the second I/O path;
    a fifth executable portion for migrating data from the source volume to the at least one target volume; and
    a sixth executable portion for, upon completion of migrating the data, removing the second I/O path, wherein:
        the OS is adapted for I/O multipath support,
        the target storage controller provides a second host device to the source storage controller, and
        the target storage controller and the source storage controller are clustered storage controllers.

10. The computer program product of claim 9, further including a seventh executable portion for, pursuant to temporarily adding the second I/O path, configuring the second I/O path to submit an unavailable status to a requesting entity.

11. The computer program product of claim 9, further including a seventh executable portion for determining whether the target storage controller has the at least one target volume comprising pass-through support to the source volume of the source storage controller.

12. The computer program product of claim 9, wherein the third executable portion for configuring the second portion of the first I/O path to the existing data is further adapted for configuring the second portion of the first I/O path least partially through a network connecting the source storage controller and the target storage controller.

13. A method of manufacturing a system for migrating existing data from a source storage controller to a target storage controller, each associated with a data processing storage subsystem, comprising:
   providing a first host module; and
   providing at least one storage module in communication with the first host module, wherein:
      the at least one storage module is adapted for configuring at least one target volume comprising pass-through support to a source volume of the source storage controller, and
      the host module is adapted for configuring a first portion of a first input/output (I/O) path from the existing data in the source storage controller to the at least one target volume, configuring a second portion of the first I/O path from the first host module to the existing data in the source storage controller, temporarily adding, via an operating system (OS) operational on the first host module, a second I/O path connecting the first host module and the source storage controller, setting at least one multipath weight to give preference to the first I/O path, utilizing a load balancing algorithm to determine whether the first I/O path exhibits a better performance than the second I/O path for implementing a greater or smaller amount of data transfer along the first I/O path or the second I/O path, migrating data from the source volume to the at least one target volume, and removing the second I/O path upon completion of migrating the data,
   wherein:
      the OS is adapted for I/O multipath support,
      the target storage controller provides a second host module to the source storage controller, and
      the target storage controller and the source storage controller are clustered storage controllers.

14. The method of manufacture of claim 13, wherein the first host module is further adapted for, pursuant to temporarily adding the second I/O path, configuring the second I/O path to submit an unavailable status to a requesting entity.

15. The method of manufacture of claim 13, wherein the first host module is further adapted for determining whether the target storage controller has the at least one target volume comprising pass-through support to the source volume of the source storage controller.

16. The method of manufacture of claim 13, wherein the first host module is further adapted for configuring the second portion of the first I/O path to the existing data at least partially through a network connecting the source storage controller and the target storage controller.

* * * * *